(12) United States Patent
Baker et al.

(10) Patent No.: US 9,047,424 B1
(45) Date of Patent: Jun. 2, 2015

(54) SYSTEM AND METHOD FOR ANALOG VERIFICATION IP AUTHORING AND STORAGE

(71) Applicant: Cadence Design Systems, Inc., San Jose, CA (US)

(72) Inventors: Mark Baker, Kinross (GB); Donald J. O'Riordan, Sunnyvale, CA (US); Keith Dennison, Edinburgh (GB)

(73) Assignee: Cadence Design Systems, Inc., San Jose, CA (US)

( * ) Notice: Subject to any disclaimer, the term of this patent is extended or adjusted under 35 U.S.C. 154(b) by 3 days.

(21) Appl. No.: 14/064,059

(22) Filed: Oct. 25, 2013

(51) Int. Cl.
*G06F 15/04* (2006.01)
*G06F 17/50* (2006.01)

(52) U.S. Cl.
CPC .................................. *G06F 17/5036* (2013.01)

(58) Field of Classification Search
USPC ......................................................... 716/139
See application file for complete search history.

(56) References Cited

U.S. PATENT DOCUMENTS

| | | | | |
|---|---|---|---|---|
| 8,533,647 | B1 * | 9/2013 | Gangadharan et al. | 716/112 |
| 8,682,631 | B2 * | 3/2014 | Chang et al. | 703/13 |
| 2012/0198411 | A1 * | 8/2012 | Bhushan et al. | 716/139 |

OTHER PUBLICATIONS

Ajeetha Kumari, "Property Specification Language Tutorial (Part 3)", PSL Reference Manual, Property Expressions: Verification Layer, Project VeriPage, PSL: Verification and Modeling Layers, Jun. 9, 2004, (6) pages.
"Separation of Concerns," http://en.wikipedia.org/wiki/Separation_of_concerns, last modified Mar. 16, 2014, pp. 1-7.

* cited by examiner

*Primary Examiner* — Eric Lee
(74) *Attorney, Agent, or Firm* — Kenyon & Kenyon LLP

(57) ABSTRACT

A system, method, and computer program product for automatically providing circuit designers with verification information for analog and mixed-signal circuit designs. A graphical user interface based environment allows circuit designers to enter verification IP while simultaneously viewing the design IP in a schematic and/or layout editor window. Embodiments maintain the verification IP in a cellview similar to the separate cellviews used for schematic and layout data. Verification IP may be selectively translated into data that is directly exportable to and usable by particular analog and mixed-signal simulators. Embodiments direct design IP and verification IP to a simulator that dynamically stitches both together during circuit verification, and tangibly outputs verification results.

23 Claims, 10 Drawing Sheets

FIG. 6

```
vunit my_test_sd_adc_don_vunit(test_sd_adc_don) { default clock = @('timer(254.5*80e-9, 8*80e-9)');

// asrt IntegratorStability
// Assert that integrator output i1 is bounded within +/-1.500000*ref as instability tends to force integrator outputs out of bound
assert: assert always abs(V(i1)) > 1.500000*V(ref);
// Assert that integrator output i2 is bounded within +/-1.500000*ref as instability tends to force integrator outputs out of bound
assert1: assert always abs(V(i2)) > 1.500000*V(ref);

}
```

600

SYSTEM AND METHOD FOR ANALOG VERIFICATION IP AUTHORING AND STORAGE

FIELD OF THE INVENTION

This patent application relates to the field of circuit simulation, and more precisely to more easily managing verification-related information for analog and mixed-signal circuit designs.

BACKGROUND

The re-use of circuit designs has become an important trend in the integrated circuit design industry. Companies may exchange or license design intellectual property (or "design IP"), typically including schematic and layout information for commonly used circuit blocks. The creation of a new integrated circuit may thus be greatly simplified by assembling pre-designed circuit blocks into a nearly complete system, with minimal new design effort required.

Verification is an important step in the process of designing and creating an electronic product. Verification helps ensure that the electronic design will work for its intended purpose, and is usually performed at several stages of the electronic design process. Circuit designers and verification engineers use different methods and analysis tools to verify circuit designs, including simulation. Simulation verifies a design by monitoring computed behaviors of the design with respect to test stimuli. Circuit performance measurements may be performed by a post-simulation engine that evaluates simulated circuit waveforms. A variety of commercially offered software programs are available for circuit simulation.

Digital and mixed-signal simulators support a concept known as a verification unit (or "vunit"' in Property Specification Language (PSL), or the System Verilog Assertions (SVA) "bindfile" equivalent). Verification units are containers of properties that describe the verification requirements of a circuit design. Verification units in the verification domain are thus rather analogous to modules or subcircuits, which are used to capture design information in the design domain. Verification units however capture verification information in a standalone entity or separate file from the circuit design itself. During simulation, the contents of a verification unit may be considered alongside corresponding modules or subcircuits of a circuit design, sometimes on a per-instance basis. In analog design, verification is currently far more limited.

Low level analog and mixed-signal circuit operations are commonly verified during simulation by performing various device checks, such as checking that individual transistors are operating within their specified Safe Operating Area (SOA). More recently, a different level of simulator dynamic checking has evolved, known generally as circuit checks, in which the functionality of a group of devices or connectivity is checked all at once. Circuit checks may be run for example to look for high impedance nodes, DC leakage paths to ground, and other commonly occurring problems. Both static and dynamic types of checks are available in newer analog simulators. Analog functional block checking has also become enabled recently within some analog simulators, e.g., PSL and/or SVA temporal assertions may now be applied to analog circuit objects. All of the various types of checks used to verify circuit operation may be included in verification intellectual property (or "verification IP").

The mechanism used for directing verification IP to an analog simulator has generally been the circuit netlist file itself, which is the primary input to familiar SPICE-type simulators. The netlist informs the simulator what needs to be checked, and how. At present, in some tools a user typically must manually edit the various checks and verification statements into the circuit netlist file produced by the design environment. Such hand editing requires simulator netlist language level skills, i.e., user understanding of the syntax and semantics of the checks to be performed, and is error prone.

One exception is that a graphical user interface (GUI) for SOA checks has been previously created that allows a user to specify the details of each check by entering data into forms at the circuit testbench level. The GUI is provided in the top level testbench editor, and the SOA check data is then stored within the testbench cellview. This approach removes the need for manual netlist editing and the resulting errors.

The testbench-based approach could be extended to the remaining types of checks (e.g., static/dynamic checks and functional assertions). Forms for entering the data to be checked could be provided in the testbench editor, and the user-entered data stored in the testbench cell data itself (i.e., in a different library cell from the design under test), and applied to the design under test by that testbench. There are some major disadvantages to testbench level checks, however. For example, such an approach does not promote re-use of the verification IP beyond that immediate testbench. Testbench level checks also do not work when the block being checked is hierarchically integrated into a different context (e.g., when it is integrated as a component of a bigger circuit). Testbench based verification data may also get out of synch with the design, or may be lost entirely.

As a result, in current practice, verification IP does not naturally travel with the design block in an IP integration use scenario. Significant confusion may persist about what has been tested, and under what assumptions it has been tested. The process of analog design integration suffers as a result, and often the design IP is thrown away for lacking corresponding verification IP. For example, after a circuit designer leaves a company, design IP is often dismissed and re-created from scratch, as any verification IP stored in a separate testbench often cannot be located. The same shortcomings would also apply to the static/dynamic circuit checks and the functional assertion checks if the testbench approach were extended.

Thus a need exists for an improved approach to management of verification IP including SOA, circuit checks, and functional checks/assertions. Accordingly, the inventors have developed a novel way to help circuit designers create, store, and maintain verification IP for analog and mixed-signal circuit designs.

BRIEF DESCRIPTION OF THE DRAWINGS

FIG. 6 is a diagram of an exported verification unit with only PSL functional assertions, according to an embodiment.

DETAILED DESCRIPTION

This patent application presents a new system, method, and computer program product for automatically helping circuit designers manage verification IP for analog and mixed-signal circuit designs. A graphical user interface based environment allows circuit designers to enter verification IP while simultaneously viewing the design IP in a schematic and/or layout editor window. In the present approach, verification IP may be stored as a new view within the design IP cell. The verification IP view is a sibling view of the cell's schematic and layout cellviews.

A target-simulator-aware process may traverse the design hierarchy, reading the verification IP databases and exporting verification units of the appropriate form for the target simulator. The process may intelligently limit the contents of the verification units to only those elements that are supported by the target simulator. Verification IP may thus be selectively translated into data that is directly exportable to and usable by particular analog and mixed-signal simulators. Embodiments may for example translate the contents of the verification IP into PSL vunits known for mixed-signal simulators, and/or into analog verification units recently introduced for SPICE-like analog circuit simulators. The verification units may exhibit some traits that are different from standard PSL vunits.

Embodiments direct the design IP and the verification IP in parallel to a simulator that may dynamically "stitch" both together during circuit verification. The simulator incorporates needed measurement elements and adds instructions needed to acquire simulation data for the verification tasks it can perform. The simulator may then tangibly output verification results. Embodiments enable verification results to be improved either automatically or manually through modification of circuit stimuli or the circuit design itself.

Figure 1:
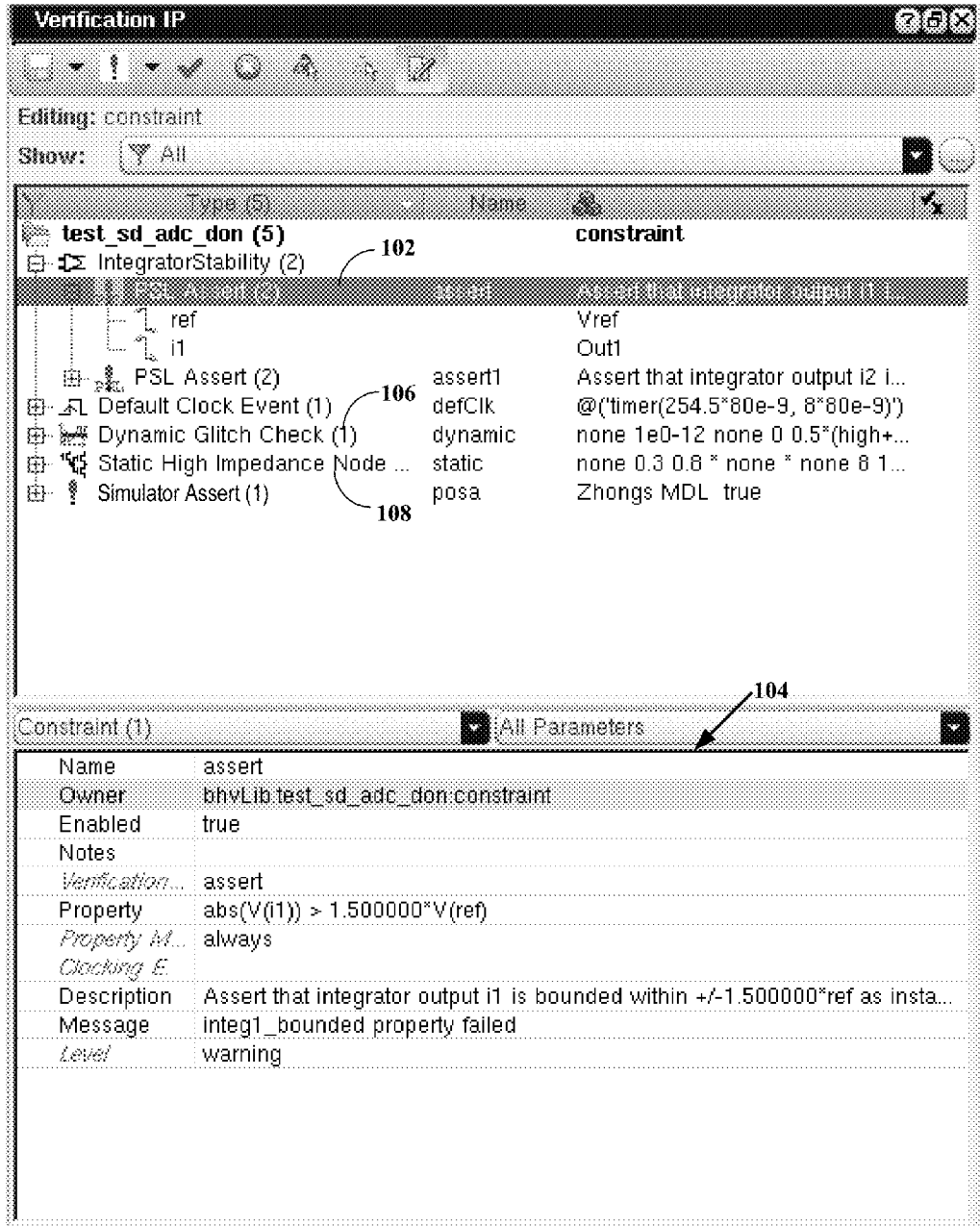
FIG. 1 is a diagram of a verification IP user interface, according to an embodiment.

FIG. 1 shows a diagram of a dedicated verification IP user interface 100, according to an embodiment. The verification IP user interface 100 comprises a GUI window for entering and storing analog block-related checks, perhaps in the very design environment used for creating that block in the first place, as opposed to entering them in the testbench. The verification IP user interface 100 may be activated alongside and interact with the schematic canvas used for analog block editing, as shown in FIG. 2.

FIG. 1 shows the verification IP user interface 100 with one specific check 102 (in this example, a particular analog PSL assertion selected from a hierarchical list of checks) shown in the top portion of the interface. The underlying assertion details are then shown in the bottom portion of the verification IP user interface 104. A number of other exemplary types of analog verification IP, e.g., an instance of a dynamic glitch check 106 and a static high impedance node check 108, are shown in the top portion of the verification IP user interface 100.

Figure 2:
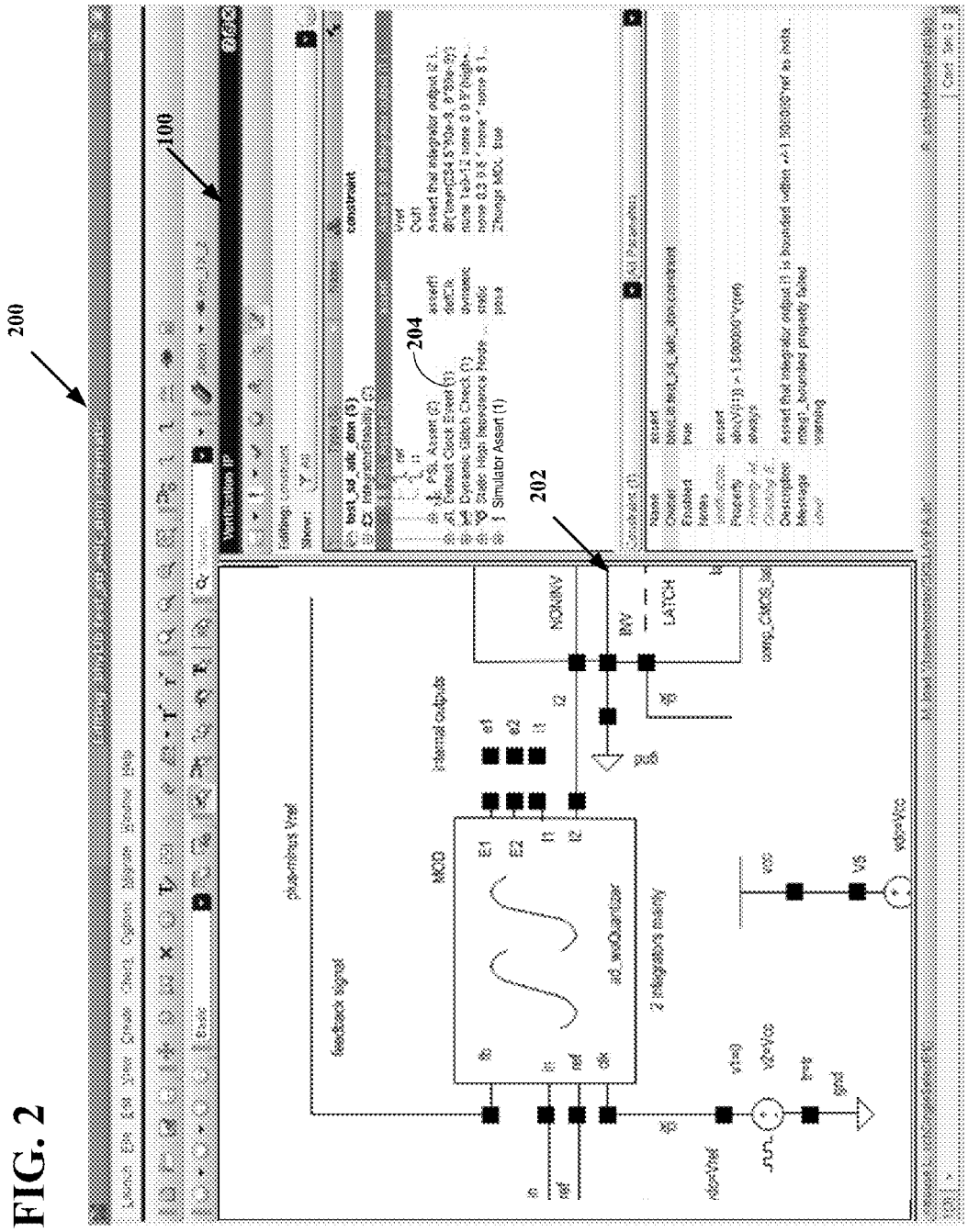
FIG. 2 is a diagram of a verification IP user interface docked alongside and interactive with a design IP environment, according to an embodiment.

FIG. 2 shows a diagram of verification IP user interface 100 docked alongside and interactive with a design IP environment 202, according to an embodiment 200. GUI fields and menus within the verification IP user interface 100 may be used to enter the checks, including for example SOA checks, static/dynamic checks, and functional/assertion checks. As the data is entered, the user may interact with the GUI components in both the verification IP user interface 100 and within the design IP (e.g., via a schematic editor) 202.

Analog block verification IP may thus be entered by the person most qualified to create it, the analog design IP engineer, in a natural environment alongside the schematic editor. The data may be entered using the common schematic editor namespace that is familiar to analog IP designers. Fields and menus within the verification IP user interface may also allow for default clocking events 204 to be generated, that may be referenced later by PSL/SVA functional assertions. The analog verification IP data entered in such fashion may then be stored within a cellview that is a sibling of the schematic cellview used to store the cell schematic itself. In other words, both the design IP cellview (i.e., the schematic) and the verification IP cellview (stored by the verification IP user interface) are stored as views of the same design cell.

Figure 3:
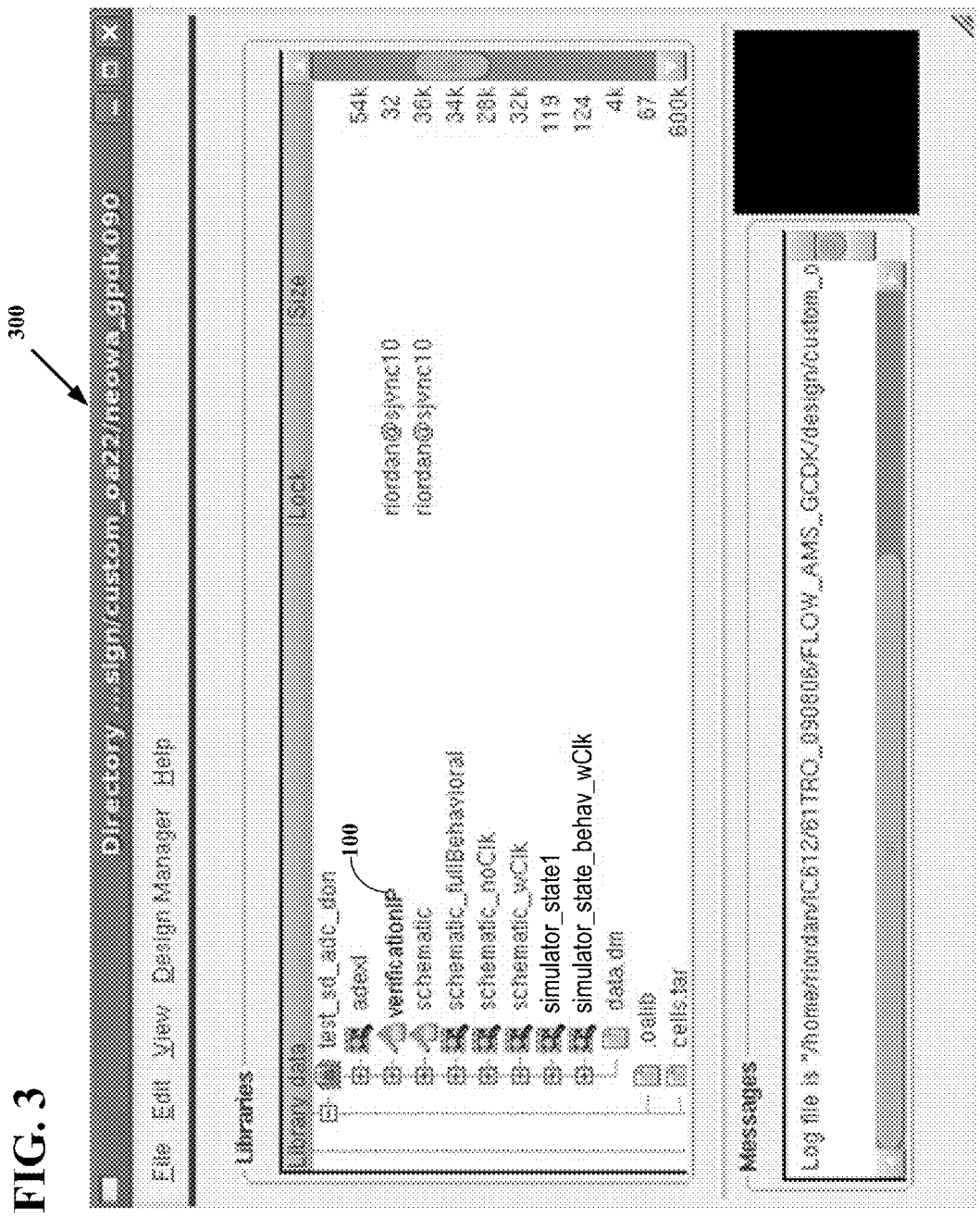
FIG. 3 is a diagram of a library manager view, according to an embodiment.

FIG. 3 shows a diagram of a library manager view 300, according to an embodiment. FIG. 3 depicts a number of available views of cell test_sd_adc_don that are each sub-branches of the test_sd_adc_don cell tree node. The verification IP cellview 100 is indicated as one such sub-branch. Use of such design cell-based storage means that when the design cell test_sd_adc_don is later copied or instantiated into an integration hierarchy, all of its verification IP is automatically copied (as with any other view of the cell) or available for reference. The verification IP is thus not lost due to being in a different testbench hierarchy.

Cell based storage as shown also allows the verification IP to be co-managed with the design IP, using existing design management tools. This means that for any given design management checkout of the cell, the version of the verification IP employed is always up to date with respect to the design IP (e.g., the schematic).

Figure 4:
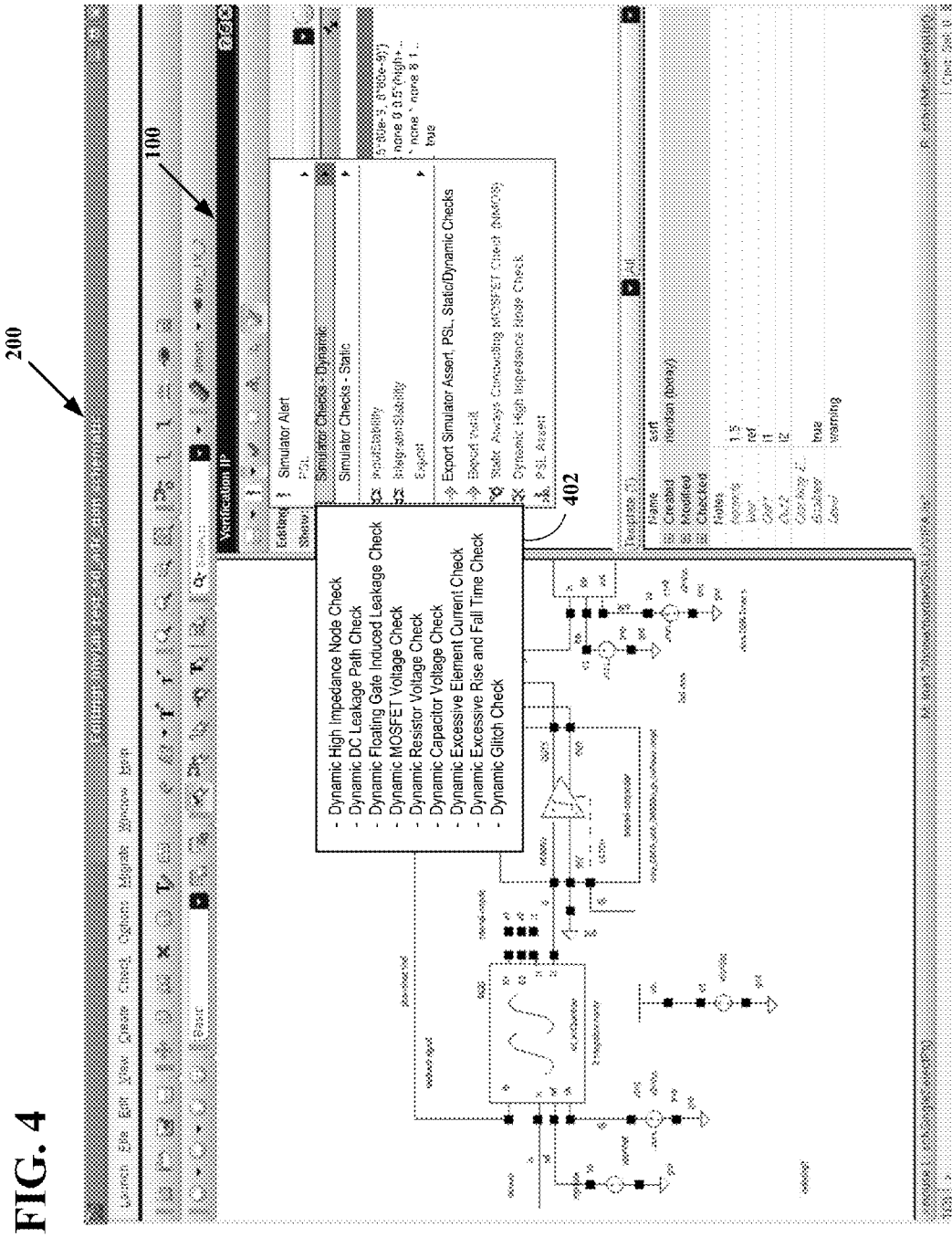
FIG. 4 is a diagram of a verification IP user interface with dynamic simulator check specification, according to an embodiment.

FIG. 4 shows a diagram of a verification IP user interface with dynamic simulator check specification, according to an embodiment. As mentioned previously, in addition to SOA checks, static and dynamic checks may be specified in the verification IP window 100. In this example, dynamic checks may be selected via a popup menu 402; a similar popup menu may be available for selecting static checks (not shown). Dynamic checks may detect high impedance nodes, DC leakage paths, floating gate induced leakage, MOSFET voltages, resistor voltages, capacitor voltages, excessive element currents, excessive rise/fall times, and glitches, for example.

Along with the verification IP creation and storage mechanism described above, embodiments enable a novel mechanism to publish the verification IP to an analog simulator. In the prior art, data stored in a testbench is typically translated into terms that the simulator can understand by creating directives in the form of top level netlist statements. These statements are directly injected by the testbench editing tool into the top level netlist being assembled as the primary input to the simulator.

In contrast, in one embodiment the analog simulator may be modified to consume one or more analog verification unit files in addition to the top level netlist itself. Analog block verification IP may thus be automatically translated from its raw storage format to something that the target simulator can directly utilize. These verification units may introduce new syntax and new simulation semantics, in which the contents of the tagged verification unit for a block may be automatically and dynamically "stitched" onto the corresponding netlisted design subcircuit of a block as the simulator flattens the hierarchical netlist.

Unlike PSL's known vunits and SystemVerilog's known bindfile mechanism, the analog verification units described may contain different types of checks that are supported by the analog simulator, i.e., they are not limited to PSL or SVA assertions. The analog verification units may contain SOA checks, static and dynamic circuit checks, and PSL/SVA functional assertions in embodiments of the present invention. The analog verification units may also contain instance statements, in which instances of observer modules (e.g., Verilog-A observers) may be instantiated. In this way, some circuit nodes or inputs of interest may be used to output measured values onto another node, which is then referenced in the various checks and/or assertions. Special checks ensure these instances are pure observers only, and do not contribute to the behavior of the design when stitched.

The embodiments may therefore first traverse the design IP looking for all schematic cells, and translate these schematic cells into corresponding SPICE language subcircuits for example, using a standard process known as netlisting. However, for each unique schematic cell that is encountered during the design IP traversal, the embodiments may determine if a verification IP cellview exists for it (e.g., one created by the verification IP user interface described above). If so, the embodiments may read the verification user interface produced database containing the design checks, and an analog verification unit file may be output for the simulator.

During this process, names of objects (e.g., circuit schematics instances and nets) may be carefully translated from the schematic namespace used in the verification IP database to the target simulator's namespace, to enable stitching in the simulator. Depending on the chosen simulator, some or all of the checks may be translated in this manner, while others may be omitted, as not all types of checks are supported by all simulators. Thus, the embodiments may determine which types of checks are supported by the current target simulator, and translate and output only those checks to the verification unit file.

Finally, as the embodiments invoke the simulator, the simulator may be informed of the existence of the new verification unit files that complement the design netlist. In one embodiment, a first mechanism for accomplishing this task may be to introduce +vunit command line arguments to the simulator, with one +vunit filename.sys argument/value pair per verification IP cellview for example. In another embodiment, a second mechanism for accomplishing this task is to create a single simulator .include file containing at least one new .vunit_include statement, with one vunit_include statement per verification IP cellview for example, and to modify the circuit netlist top level input to contain a reference to that single .include file. The .include file may then .vunit_include each of the individual vunits on a per-cell basis.

Figure 5:
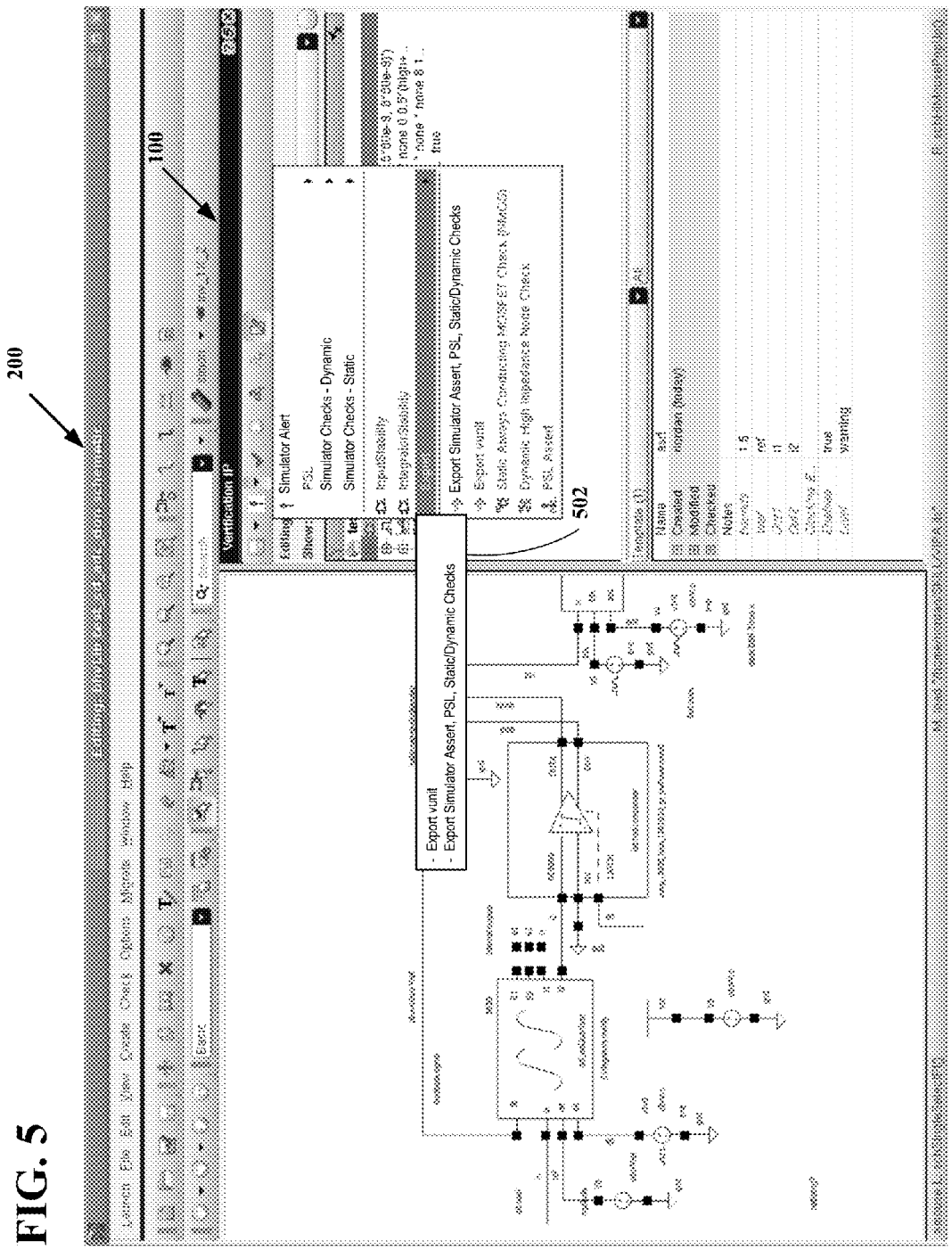
FIG. 5 is a diagram of a verification IP user interface with export capability, according to an embodiment.

FIG. 5 shows a diagram of a verification IP user interface with export capability, according to an embodiment. Verification units may also be exported independently of the netlisting operation, as shown by the export menu 502. The exported/netlisted verification unit contents may also be customized to the target simulator. When the "Export→Export vunit" sub-menu item is chosen for example, a vunit file suitable for a particular mixed-signal simulator may be exported as described above.

FIG. 6 shows a diagram of an exemplary exported verification unit 600 with only PSL functional assertions directed to a mixed-signal simulator, according to an embodiment. Since the mixed-signal simulator may not support the static/dynamic checks, these checks are preferably not included in the exported vunit contents. Instead, a relatively standard PSL vunit file may be exported that contains only PSL functional assertions, and a default clock statement for the analog PSL clocking event, both constructs which are supported by the mixed-signal simulator.

Figure 7:
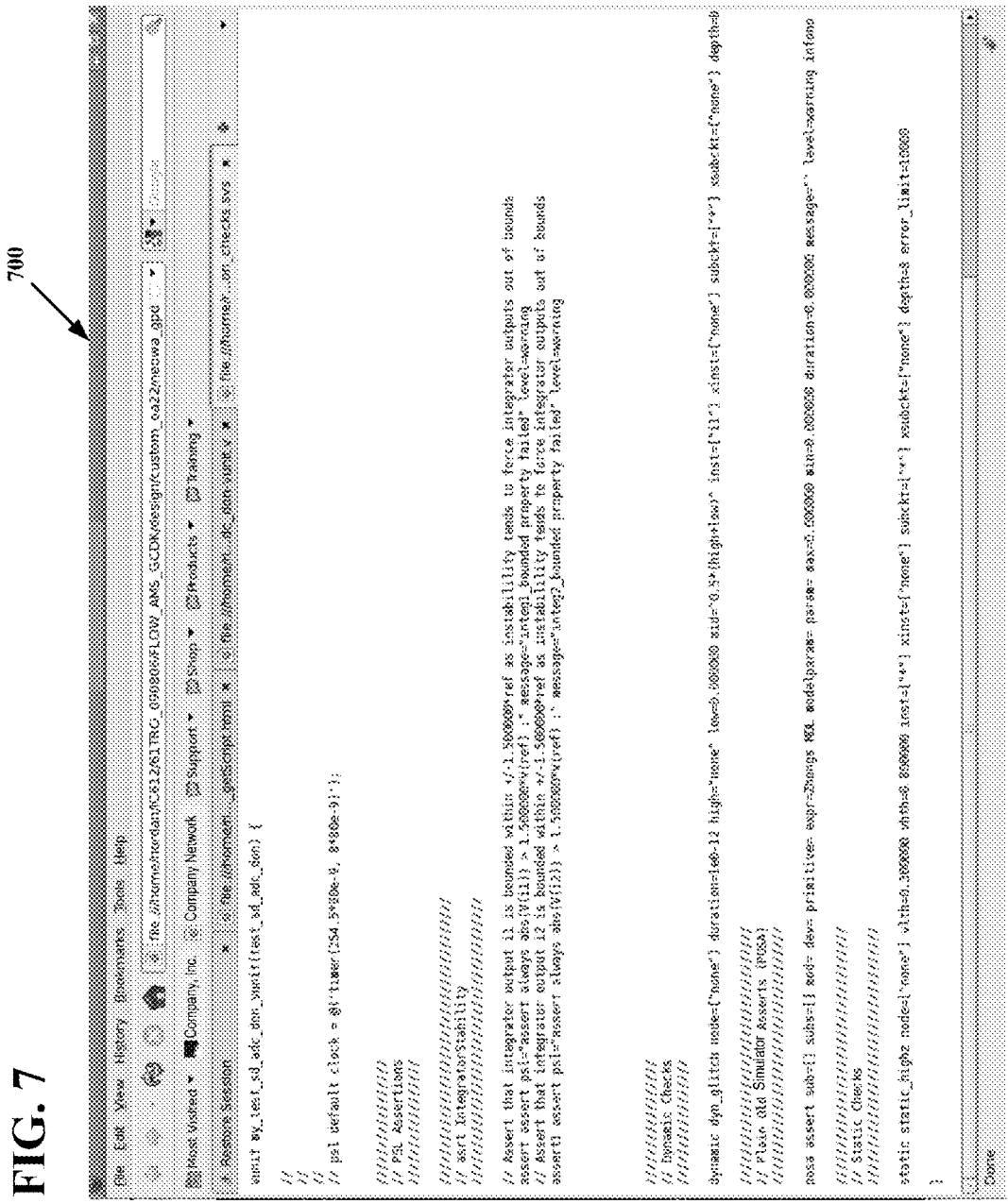
FIG. 7 is a diagram of an exported analog verification unit with PSL functional assertions, dynamic, and static circuit checks, according to an embodiment.

In contrast, when the chosen simulator is one that supports a richer variety of analog checks, a corresponding analog verification unit 700 may be exported by an embodiment. FIG. 7 thus shows a diagram of an exported analog verification unit 700 with PSL functional assertions, dynamic and static circuit checks, according to an embodiment.

Figure 8:
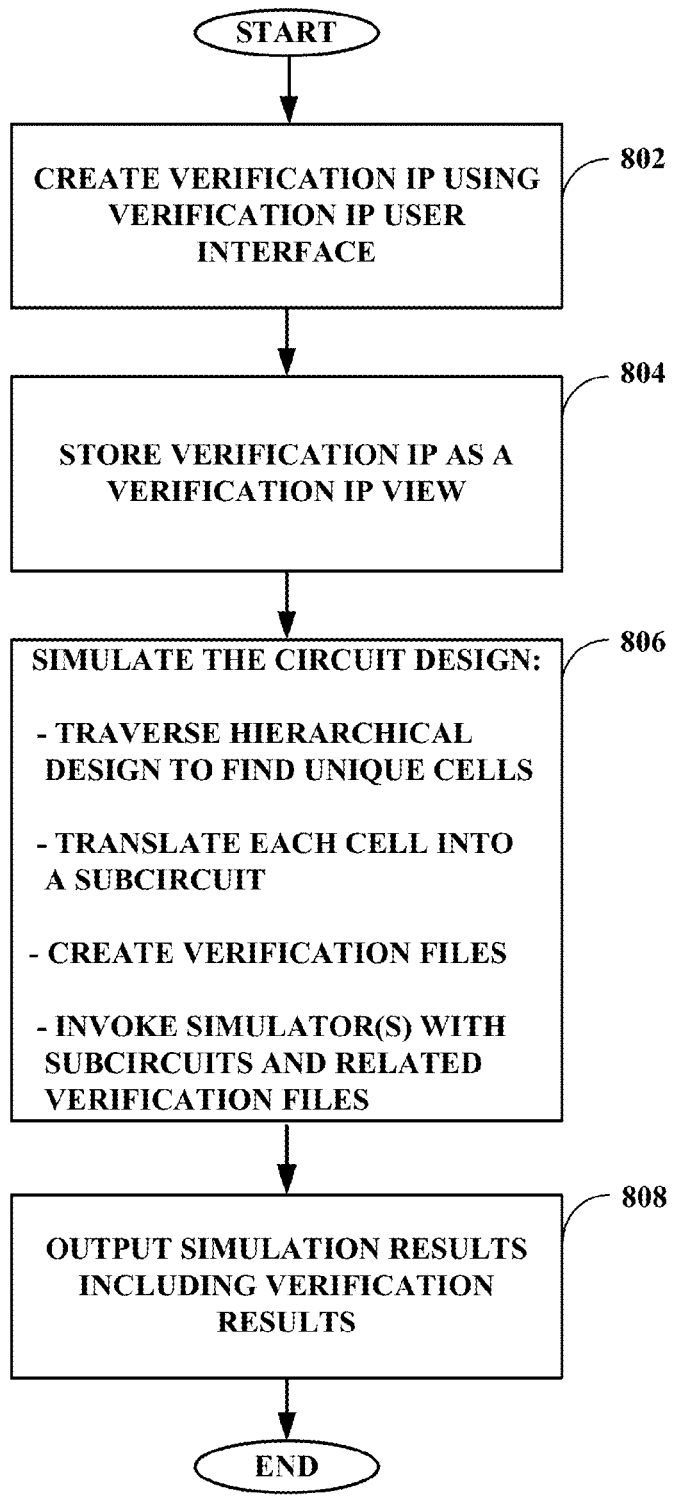
FIG. 8 is a flowchart of the verification IP management methodology, according to an embodiment.

FIG. 8 shows a flowchart of the verification IP management methodology described above, according to an embodiment. In 802, a user may create verification IP for a circuit design using a verification IP user interface as previously described. The verification IP user interface may be deployed with a design IP editor, such as a schematic editor. The verification IP may include generated default clocking events. In 804, the verification IP may be stored as a separate verification IP view alongside the design IP view for subsequent retrieval.

In 806, a computer may simulate the circuit design with one or more circuit simulators, and in 808 output simulation results including the circuit design verification results. Analog and mixed-signal circuit simulators may be used. In one embodiment, simulating the circuit design may comprise traversing an input hierarchical design to find unique schematic cells, translating each unique cell into a corresponding subcircuit, creating verification files, and invoking the target circuit simulator. The circuit simulator may be provided with each subcircuit and corresponding verification files for each subcircuit. As described earlier, in one embodiment the verification file may comprise a .include file. One or more +vunit command line arguments may also be used, as previously noted.

In one embodiment, the input hierarchical design may be traversed once, and for each cell, translation of both the connectivity information to subcircuits and the verification IP to verification files may be performed at substantially the same time. However, other embodiments are within the scope of the invention. For example, one embodiment may traverse the design twice, with one traversal performing subcircuit creation, and a different (e.g., either prior or subsequent) traversal performing verification file creation.

In one embodiment, translating each cell into a corresponding subcircuit may now further comprise determining if a verification IP cellview exists for the cell, and if so, reading a corresponding verification database containing design checks required, and determining which design checks are supported by particular circuit simulators. Unsupported design checks may be omitted for efficiency. Object names in a circuit design may be translated during creation of a verification file with the supported design checks. The circuit simulator may use the subcircuits and created corresponding verification files as its inputs. The methodology described above, or parts thereof, may be repeated by modifying circuit stimuli and/or the circuit design to improve verification results, either manually by a user or automatically.

To summarize, the embodiments of the present invention enable cell-based verification IP storage, as a sibling view to the schematic design IP, so the verification IP always travels with the cell and design IP, does not get lost, and is co-managed along with the design IP. This greatly improves design IP re-use, debugging, and integration. However, the addition of verification units to the analog simulator allows verification IP to be produced and maintained separately from the design IP while dynamically stitched together by the simulator. Simulator-specific verification units may be produced from a single verification IP source. This flexible approach to verification IP management greatly improves compatibility with verification IP management approaches already used for digital simulation (e.g., PSL vunits, and SystemVerilog bindfiles), which is important in a mixed-signal verification context.

Figure 9:
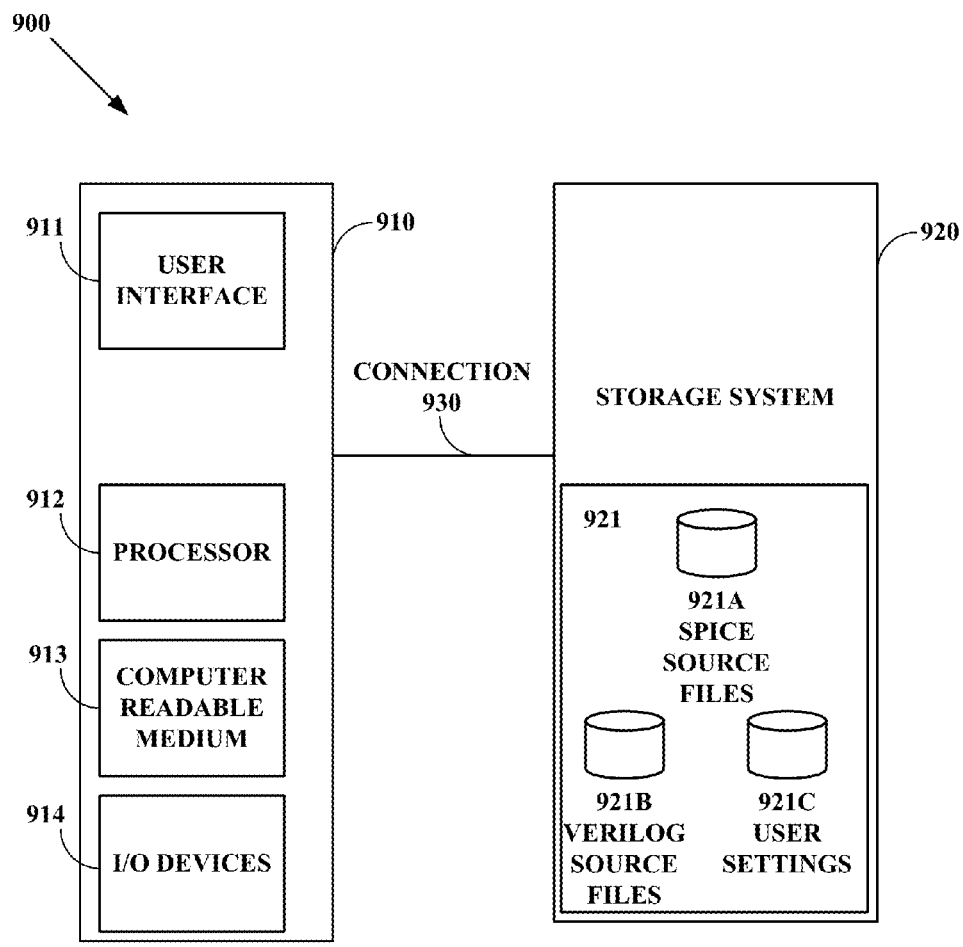
FIG. 9 is a block diagram of a circuit analysis system, according to an embodiment.

FIG. 9 shows a block diagram of an exemplary circuit analysis system 900, according to an embodiment. This system may provide simulator functionality for any of the methods described above. A user may access the system 900 through a standalone client system, client-server environment, or a network environment. System 900 may comprise one or more clients or servers 910, one or more storage systems 920, and a connection or connections 930 between and among these elements.

Client 910 may execute instructions stored on transitory or non-transitory computer readable medium 913 with processor 912, and may provide a user interface 911 to allow a user to access storage system 920. The instructions may be part of a software program or executable file that may operate electronic design automation (EDA) software. Client 910 may be any computing system, such as a personal computer, workstation, mobile computer, or other device employing a processor which is able to execute programming instructions. User interface 911 may be a GUI run in a user-controlled application window on a display. A user may interact with user interface 911 through one or more input/output (I/O) devices 914 such as a keyboard, a mouse, or a touch screen.

Storage system 920 may take any number of forms, including but not limited to a server with one or more storage devices attached to it, a storage area network, or one or a plurality of non-transitory computer readable media. Databases 921 may be stored in storage system 920 such that they may be persistent, retrieved, or edited by the user. Databases 921 may include SPICE source files 921A, Verilog source files 921B, and a user input database 921C for example. These databases may be kept as separate files or systems, or may be merged together in any appropriate combination.

Only one client 910 is shown connected to storage system 920 through connection 930, which may be a simple direct wired or wireless connection, a system bus, a network connection, or the like, to provide client 910 with access to storage system 920. In another aspect, connection 930 may enable multiple clients 910 to connect to storage system 920. The connection may be part of a local area network, a wide area network, or another type of network, again providing one or more clients with access to storage system 920. Depending on system administrator settings, client 910's access to system storage 920 or to other clients may be limited.

Figure 10:
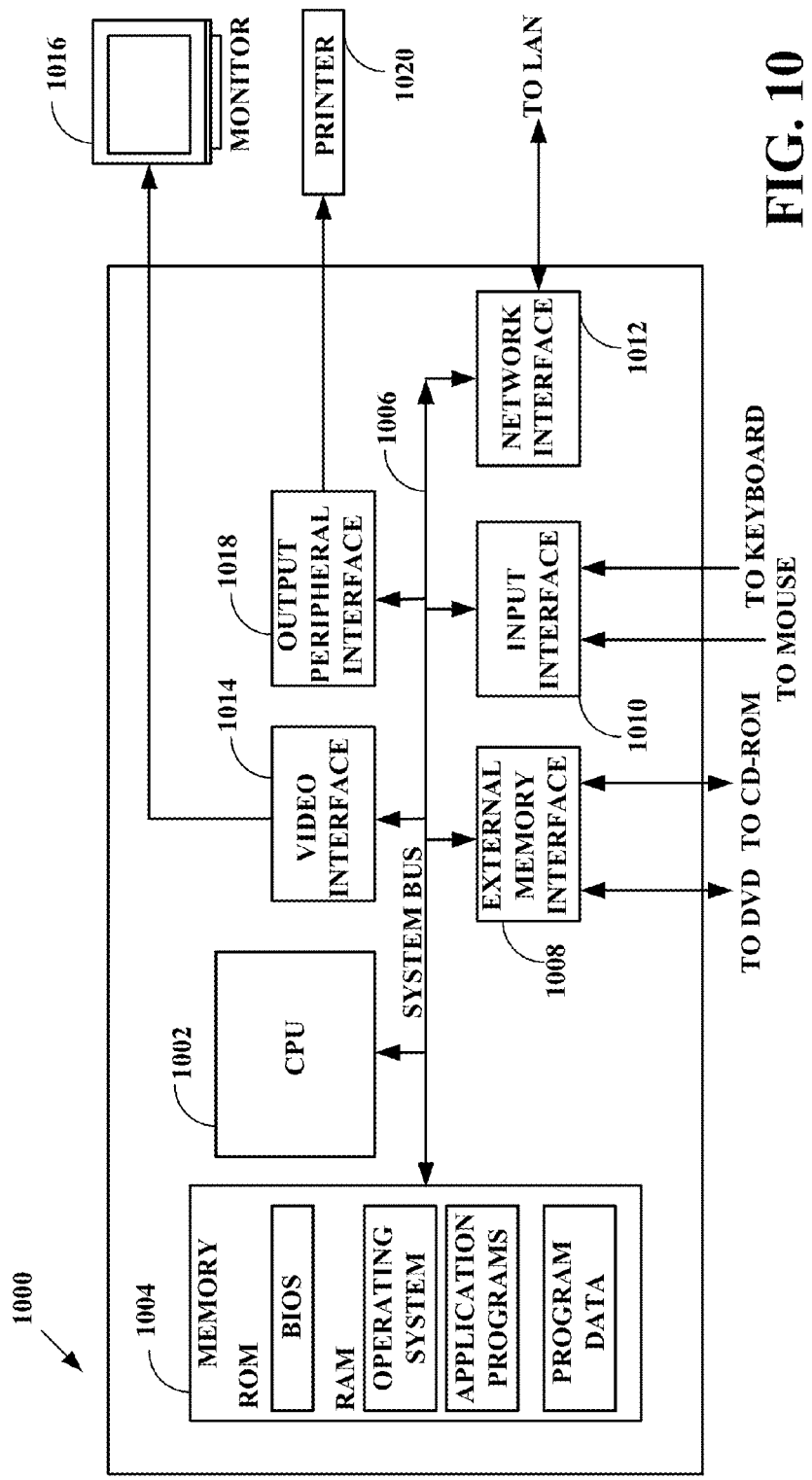
FIG. 10 is a diagram of a computer system, according to an embodiment.

FIG. 10 depicts an exemplary computer system comprising the structure for implementation of the embodiments described above. Computer system 1000 comprises a central processing unit (CPU) 1002 that processes data stored in memory 1004 exchanged via system bus 1006. Memory 1004 typically includes read-only memory, such as a built-in operating system, and random-access memory, which may include an operating system, application programs, and program data. Computer system 1000 also comprises an external memory interface 1008 to exchange data with a DVD or CD-ROM for example. Further, input interface 1010 may serve to receive input from user input devices including but not limited to a keyboard and a mouse. Network interface 1012 may allow external data exchange with a local area network (LAN) or other network, including the internet. Computer system 1000 also typically comprises a video interface 1014 for displaying information to a user via a monitor 1016. An output peripheral interface 1018 may output computational results and other information to output devices including but not limited to a printer 1020.

Computer system 1000 may comprise for example a personal computer or an engineering workstation, each of which is widely known in the art and is commonly used for integrated circuit design tasks, along with software products commercially available for performing computer-aided integrated circuit design tasks. Computer system 1000 may also comprise a mobile computer, including for example a tablet computer or a smart phone. The computer system of FIG. 10 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method for managing circuit design verification IP, the method comprising:
   creating verification IP that defines checks for verifying operation of a circuit design, using a dedicated verification IP user interface separate from a design IP user interface;
   storing the verification IP as a separate verification IP view for subsequent retrieval;
   using a computer and the verification IP, simulating the circuit design with a circuit simulator to generate circuit design verification results; and
   outputting the circuit design verification results.

2. The method of claim 1 wherein the verification IP user interface is deployed alongside and interactively with a design IP editor in a design environment.

3. The method of claim 1 wherein the verification IP includes generated default clocking events.

4. The method of claim 1 wherein simulating the circuit design further comprises:
   traversing an input hierarchical design to find unique schematic cells;
   translating each cell into a corresponding subcircuit; and
   invoking the circuit simulator with each subcircuit and corresponding verification files.

5. The method of claim 4 wherein the translating further comprises:
   determining if a verification IP cellview exists for the cell;
   reading a corresponding verification database containing design checks;
   determining which design checks are supported by the circuit simulator; and
   outputting a verification file with supported design checks and translated object names.

6. The method of claim 1 wherein the circuit simulator is one of a SPICE simulator and a mixed-signal simulator.

7. The method of claim 1 further comprising modifying at least one of circuit stimuli and the circuit design to improve the verification results, at least one of manually and automatically.

8. The method of claim 1 wherein the verification IP view is a new view within a design cell.

9. A non-transitory computer readable medium storing instructions that, when executed by a processor, perform a method for managing circuit design verification IP comprising:
   creating verification IP that defines checks for verifying operation of a circuit design, using a dedicated verification IP user interface separate from a design IP user interface;
   storing the verification IP as a separate verification IP view for subsequent retrieval;
   using the verification IP, simulating the circuit design with a circuit simulator to generate circuit design verification results; and
   outputting the circuit design verification results.

10. The medium of claim wherein the verification IP user interface is deployed alongside and interactively with a design IP editor in a design environment.

11. The medium of claim 9 wherein the verification IP includes generated default clocking events.

12. The medium of claim 9 wherein simulating the circuit design further comprises:
    traversing an input hierarchical design to find unique schematic cells;
    translating each cell into a corresponding subcircuit; and
    invoking the circuit simulator with each subcircuit and corresponding verification files translating further comprises:
    determining if a verification IP cellview exists for the cell;
    reading a corresponding verification database containing design checks;
    determining which design checks are supported by the circuit simulator; and
    outputting a verification file with supported design checks and translated object names.

13. The medium of claim 12 wherein the translating further comprises:
    determining if a verification IP cellview exists for the cell;
    reading a corresponding verification database containing design checks;
    determining which design checks are supported by the circuit simulator; and
    outputting a verification file with supported design checks and translated object names.

14. The medium of claim 9 wherein the circuit simulator is one of a SPICE simulator and a mixed-signal simulator.

15. The medium of claim 9 wherein the method further comprises modifying at least one of circuit stimuli and the circuit design to improve the verification results, at least one of manually and automatically.

16. The medium of claim 9 wherein the verification IP view is a new view within a design cell.

17. A system for managing the circuit design verification IP, comprising:
    a memory storing executable instructions; and
    a processor executing instructions to:
      create verification IP that defines checks for verifying operation of a circuit design, using a dedicated verification IP user interface separate from a design IP user interface;
      store the verification IP as a separate verification IP view for subsequent retrieval;
      using the verification IP, simulate the circuit design with a circuit simulator to generate circuit design verification results; and
      output the circuit design verification results.

18. The system of claim 17 wherein the verification IP user interface is deployed alongside and interactively with a design IP editor in a design environment.

19. The system of claim 17 wherein the verification IP includes generated default clocking events.

20. The system of claim 17 wherein the processor executes instructions to simulate the circuit design by:
    traversing an input hierarchical design to find unique schematic cells;
    translating each cell into a corresponding subcircuit; and
    invoking the circuit simulator with each subcircuit and corresponding verification files.

21. The system of claim 20 wherein the translating further comprises:
   determining if a verification IP cellview exists for the cell;
   reading a corresponding verification database containing design checks;
   determining which design checks are supported by the circuit simulator; and
   outputting a verification file with supported design checks and translated object names.

22. The system of claim 17 wherein the processor further executes instructions to automatically modify at least one of circuit stimuli and the circuit design to improve the verification results.

23. The system of claim 17 wherein the verification IP view is a new view within a design cell.

* * * * *